(12) United States Patent
Danielowski et al.

(10) Patent No.: US 9,541,037 B2
(45) Date of Patent: Jan. 10, 2017

(54) FUEL VAPOR STORAGE AND RECOVERY APPARATUS

(71) Applicant: Kautex Textron GmbH & Co. KG, Bonn (DE)

(72) Inventors: Karsten Danielowski, Troisdorf (DE); Ralph Mohr, Bonn (DE); Bjoern Stell, Bergisch Gladbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/431,088

(22) PCT Filed: Sep. 3, 2013

(86) PCT No.: PCT/EP2013/068127
§ 371 (c)(1),
(2) Date: Mar. 25, 2015

(87) PCT Pub. No.: WO2014/048683
PCT Pub. Date: Apr. 3, 2014

(65) Prior Publication Data
US 2015/0260129 A1   Sep. 17, 2015

(30) Foreign Application Priority Data

Sep. 25, 2012   (EP) .................................... 12006701

(51) Int. Cl.
| | | |
|---|---|---|
| *F02M 25/08* | (2006.01) | |
| *B01D 53/04* | (2006.01) | |
| *F02D 41/00* | (2006.01) | |

(52) U.S. Cl.
CPC ...... *F02M 25/0854* (2013.01); *B01D 53/0415* (2013.01); *F02M 25/089* (2013.01);
(Continued)

(58) Field of Classification Search
CPC ............ F02M 25/0854; F02M 25/0836; F02M 25/089; F02M 25/0872; F02D 41/003; F02D 41/0032; F02D 41/0037; F02D 41/004; F02D 41/0042; F02D 41/0045
(Continued)

(56) References Cited

U.S. PATENT DOCUMENTS 2,406,308 A   8/1946   Vokes et al.
3,730,158 A   5/1973   St. Amand
(Continued)

FOREIGN PATENT DOCUMENTS

| DE | 2256463 A1 | 6/1974 |
|---|---|---|
| DE | 102012013854 A1 | 12/2012 |
| WO | 2009080127 A1 | 7/2009 |

OTHER PUBLICATIONS

English language PCT International Search Report and Written Opinion mailed Oct. 11, 2013, received in corresponding PCT Application No. PCT/EP13/68127, 9 pgs.

*Primary Examiner* — Mahmoud Gimie
(74) *Attorney, Agent, or Firm* — Grossman Tucker Perreault & Pfleger, PLLC

(57) ABSTRACT

The invention refers to a fuel vapor storage and recovery apparatus comprising a housing (2) defining at least first and second compartments, at least one compartment being filled with an adsorbent material, at least one tank port (5) connectable to a fuel tank vent line, at least one atmospheric vent port (7), an outer housing member (8) defining a first outer compartment (3), an inner housing member defining a second inner compartment (4), the first outer compartment (3) encompassing the second inner compartment (4), wherein the inner housing member (9) is fitted into the outer housing member (8) at one end of the housing (2), such that a wall (13) of the inner housing member (9) engages an inner
(Continued)

wall of the outer housing member (8) and wherein the inner housing member (9) and the outer housing member (8) are sealed against each other by means of a closure cap (14).

10 Claims, 2 Drawing Sheets

(52) U.S. Cl.
CPC .... *F02M 25/0836* (2013.01); *F02M 25/0872* (2013.01); *B01D 2253/102* (2013.01); *B01D 2257/702* (2013.01); *B01D 2259/4516* (2013.01); *F02D 41/003* (2013.01); *F02D 41/004* (2013.01); *F02D 41/0032* (2013.01); *F02D 41/0042* (2013.01); *F02D 41/0045* (2013.01); *Y10T 29/49826* (2015.01)

(58) Field of Classification Search
USPC .................... 123/519, 518, 516, 520, 698
See application file for complete search history.

(56) References Cited

U.S. PATENT DOCUMENTS

| | | | | |
|---|---|---|---|---|
| 4,280,466 A | * | 7/1981 | Walters | F02M 25/0836 |
| | | | | 123/520 |
| 5,520,156 A | * | 5/1996 | Brunnhofer | B01D 35/027 |
| | | | | 123/510 |
| 5,915,364 A | * | 6/1999 | Katou | F02M 25/0854 |
| | | | | 123/519 |
| 2002/0108897 A1 | | 8/2002 | Pavlin et al. | |
| 2011/0168025 A1 | * | 7/2011 | Huynh | F02M 25/0854 |
| | | | | 96/126 |

* cited by examiner

FUEL VAPOR STORAGE AND RECOVERY APPARATUS

FIELD OF INVENTION

The present invention relates to a fuel vapor storage and recovery apparatus comprising a housing defining at least first and second compartments, at least one compartment being filled with an adsorbent material, at least one vapor inlet port connectable to a fuel tank vent line, at least one atmospheric vent port, an outer housing member defining a first outer compartment, an inner housing member defining a second inner compartment, the first outer compartment encompassing the second inner compartment.

The invention moreover refers to a method for producing a fuel vapor storage and recovery apparatus comprising first and second compartments, at least one compartment receiving an adsorbent material.

BACKGROUND ART

A fuel vapor storage and recovery apparatus of the above-referred kind is for instance disclosed in WO 2010/032065 A1. This fuel vapor storage and recovery apparatus which is referred to as an adsorbent canister for control of emission for an automobile fuel tank comprises primary and secondary adsorbent beds and a flow passage configured to connect the adsorbent beds in series. The primary adsorbent bed encompasses/surrounds the secondary adsorbent bed. The primary adsorbent bed including a packed granular carbon is configured for flow end to end and has a polygonal, overall cylindrical sidewall, the secondary adsorbent bed being arranged in an internal passage of the canister extending from one end to another of the primary adsorbent bed, the secondary adsorbent bed being located in this internal flow passage. Between the primary and secondary adsorbent bed an airspace is defined which forms a kind of diffusion barrier between the primary and secondary adsorbent bed. The internal passage within the primary adsorbent bed is defined by a tube-like housing member which is sealed against a two-part cover fitted onto the top wall of the outer housing. This two-part cover includes a tank port, an atmospheric vent port and a purge port. The bottom of the carbon canister housing is sealed by an end cap including partitions which define a gas flow connection between the open ends of the primary and secondary adsorbent beds.

This design is rather compact and effective.

However, sealing of the inner tube defining the internal passage through the main carbon bed against the top wall of the carbon canister housing has to be achieved by a rubber seal or a similar sealing means. Moreover, mechanical interlocking between the inner tube and the outer housing has to be achieved somehow, for instance by a bajonet or locking nut.

To ensure leak tightness of the assembly during operation, there must, however, be conducted a quality insurance leak test to ensure the seal is not missing during preassembly or the seal is not damaged. Because the seal is quite small in cross-sectional area and rather large in diameter, assembly is quite difficult. Moreover, the seal takes valuable space in an area of the canister, where the canister design is critical.

SUMMARY OF THE INVENTION

Accordingly, it is an object of the present invention to provide a fuel vapor storage and recovery apparatus of the above-referred kind, which avoids the aforementioned disadvantages.

Moreover, it is an object of the present invention to provide a method for producing such a fuel vapor storage and recovery apparatus in a very simple and cost-effective manner.

These and other objects are achieved by the features according to the independent claims. Advantageous embodiments may be derived from the dependent claims.

According to the present invention, there is provided a fuel vapor storage and recovery apparatus comprising:
  a housing defining at least first and second compartments,
    at least one compartment being filled with an adsorbent material,
  at least one vapor inlet port connectable to a fuel tank vent line,
  at least one atmospheric vent port,
  an outer housing member defining a first outer compartment,
  an inner housing member defining a second inner compartment, the first outer compartment encompassing the second inner compartment,
  wherein the inner housing member is fitted into the outer housing member at one end of the housing such that a wall of the inner housing member engages an inner wall of the outer housing member and wherein the inner housing member and the outer housing member are sealed against each other by means of a closure cap covering at least a front face of the inner wall of the outer housing and a front face of the wall of the inner housing.

In other words, the design according to the present invention is such that the inner housing member and the outer housing member are fitted into each other such that in the area of their mutual engagement, sealing may be achieved by the closure cap itself covering aligned front faces of the inner wall of the outer housing is as well as the wall of the inner housing. No additional sealing means is required, sealing is achieved by a sealing surface of the closure cap.

In one advantageous embodiment of the fuel vapor storage recovery apparatus according to the present invention, the closure cap is welded onto the inner wall of outer housing member and onto the wall of the inner housing member, sealing integrity being achieved by the weld between the closure cap and the walls of the outer housing member and the inner housing member in the area of their mutual engagement.

Preferably, the inner wall of the outer housing member and the wall of the inner housing member engage each other by positively interlocking so that the inner housing member and the outer housing member are at least fixed to each other in a circumferential direction when fitted into each other.

In one advantageous embodiment of the fuel vapor storage recovery apparatus according to the invention, the inner wall of the outer housing member defines a neck portion extending into the outer housing member and mating with a correspondingly shaped neck portion of the inner housing member. Such positive interlocking between the outer housing member and the inner housing member may be for instance achieved by tail connectors which extend an axial direction of the housing members.

Preferably, the closure cap includes the atmospheric vent port, i.e. defines the vent port including a connector for receiving an atmospheric vent line.

The neck portion of the outer housing member and the neck portion of the inner housing member may have each a circular cross-section.

Basically, the outer housing member and the inner housing member are concentrically arranged relative to each other. Concentrically in terms of the present invention does not necessarily mean that the outer housing member as well as the inner housing member have an overall circular cross-section. The outer housing member may for instance have any cross-section including elliptical, oval or rectangular. Also the inner housing member defining an internal passage within the first compartment may have any cross-section and also may have varying cross-sections over its length.

It will however be appreciated that the neck portion of the outer housing member and the neck portion of the inner housing member each have a circular cross-section. Due to this design, it is possible to rotation-weld the closure cap on the front faces of the walls of the outer and inner housing members.

Preferably, the housing consists of thermoplastic resin, such as polyethylene, polypropylene, POM, ABS etc.

The above-mentioned object of the present invention is also achieved by a method for producing a fuel vapor storage and recovery apparatus comprising first and second compartments, at least one compartment receiving an adsorbent material, the method including the following steps:

providing at least one outer housing member defining a first outer compartment, providing an inner housing member defining a second inner compartment, the inner and outer housing member being configured such that the inner housing member may be engaged with an inner wall of the outer housing member, the outer housing member thereby encompassing the inner housing member, axially fitting the inner housing member into the outer housing member such that the inner housing member and the outer housing member are fixed relative to each other in a circumferential direction, sealing the inner housing member and the outer housing member relative to each other in the area of their mutual engagement by welding a closure cap on both the inner housing member and the outer housing member, such that the weld seals the inner housing and the outer housing against each other.

Preferably, the closure cap is rotation-welded onto the housing.

The closure cap is preferably rotated relative to the inner and outer members while being held in place with a sealing surface in engagement with aligned faces of the inner housing member wall and the inner wall of the outer housing member, so that due to the frictional heat and the exerted pressure, a leak-tight welding of the housing member walls in the area of their engagement takes place.

The design according to the present invention as well as the method as described above have the advantage that assembly of the housing parts is very easy, additional means for sealing like O-rings or the like are not required. An additional quality insurance leak test to ensure the sealing integrity is not required. Additional locking nuts or locking rings are also not required. The design is very simple and cost-effective. The closure cap which basically only has a diameter slightly bigger than the diameter of the neck portion of the inner housing member at the same time provides the atmospheric vent port as well as sealing of the housing parts/housing members.

Finally, this design meets optimum space requirement in that additional space is gained in the top area of the housing of the fuel vapor storage and recovery apparatus.

One advantageous embodiment of the fuel vapor storage and recovery apparatus will be hereinafter described with reference to the accompanying drawings, in which:

DETAILED DESCRIPTION OF THE INVENTION

Figure 1:
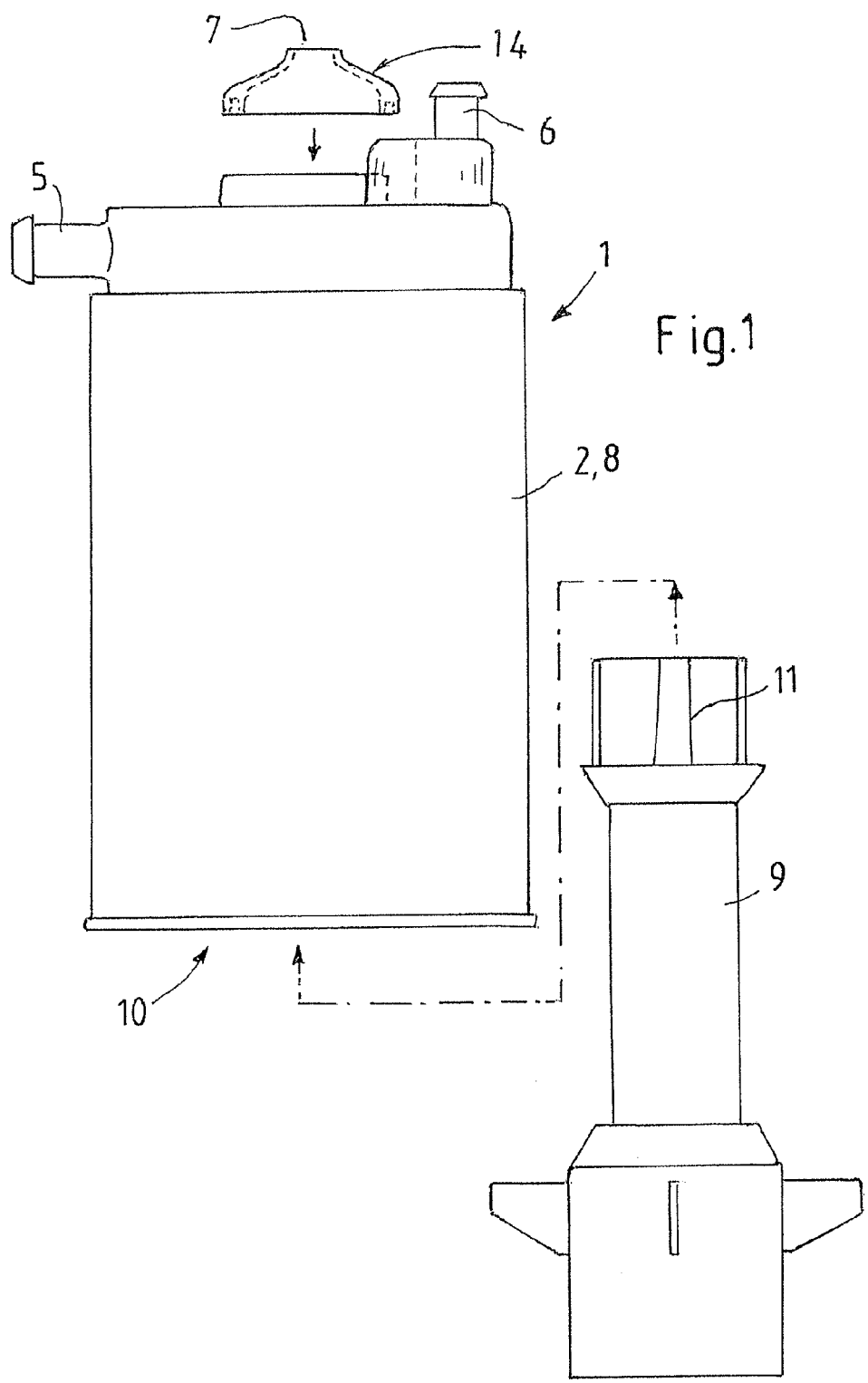
FIG. 1 shows an exploded view of the fuel vapor storage and recovery apparatus according to the instant invention.

For the sake of simplicity, the fuel vapor storage and recovery apparatus according to the present invention is hereinafter referred to as carbon canister, which has reference numeral 1. The carbon canister includes a plastic housing 2, is which defines a first outer compartment 3 and a second inner compartment 4. The housing includes in its top region (FIG. 1 shows the carbon canister 1 in its mounting position) a tank port 5, a purge port 6 and an atmospheric vent port 7.

As aforementioned, the carbon canister 1 is at least partially filled with an adsorbent material, for instance in the form of a granular carbon bed for storing and receiving evaporative emissions from a motor vehicle fuel tank. For this purpose the carbon canister 1 is connected via tank port 5 to a vent line of a fuel tank.

Evaporative fuel emission occurs principally due to venting from the vehicles' fuel tank. Because the fuel is volatile, the air in a fuel tank will generally be heavily laden with fuel vapor, and it is the escape of this air to the atmosphere that is a primary source of fuel vapor emissions from motor vehicles. Either during the time when a vehicle is parked or during refueling, vapor-laden air will be passed via tank port 5 into the carbon canister 1, in which the gas (fuel-laden vapor) is guided to the carbon bed towards the atmospheric vent port 7, where the cleaned air will be released to the atmosphere. During engine cycles of the vehicle, purging air is drawn from the engine via purge port 6 backwards through the atmospheric vent port 7, thereby cleaning the carbon bed within the carbon canister 1.

As this may be readily seen from the appendent drawings, the housing 2 of the carbon canister includes an outer housing member 8 and an inner housing member 9, which, when mounted, defines the first outer compartment 3 surrounding/embedding/encompassing an internal passage through the housing 2 defined by the inner housing member 9.

During normal operation of the carbon canister 1, vapor-laden gas will be passed from the tank port 5 in the top region of the housing 2 end to end through the first to outer compartment, will then be diverted in a gas space in the bottom 10 of the housing 2 and flow end to end through the inner housing member 9 towards the atmospheric vent port 7. The inner housing member 9 may encompass a secondary carbon bed either stuffed with granular adsorbent, for instance granular carbon, or may include a monolithic carbon as well as a purge heater, i.e. a heating element for preheating the purging air, in order to enhance desorption during a purging cycle.

Of course, the carbon canister according to the present invention may comprise further compartments, which is not critical to the invention.

Figure 2:
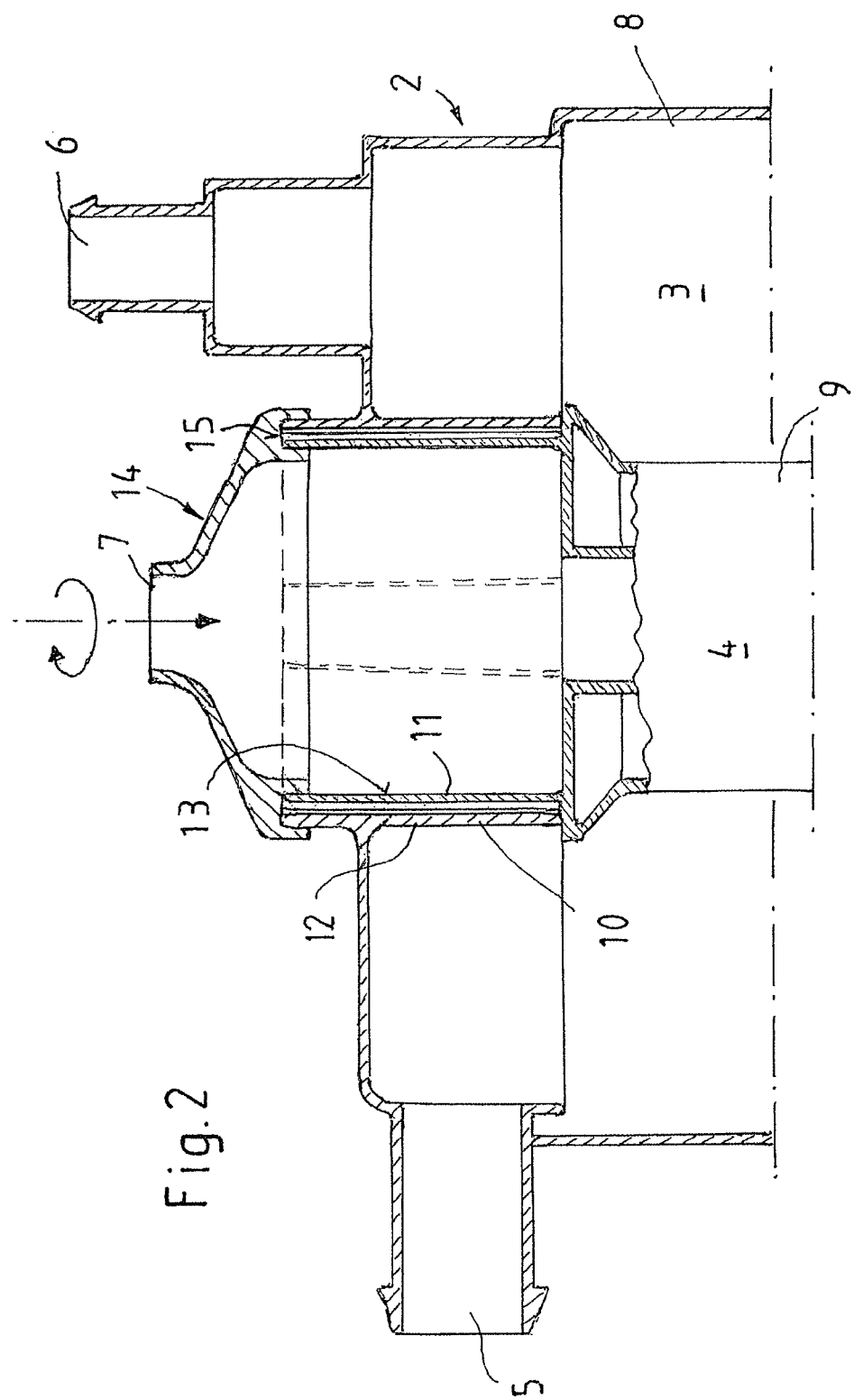
FIG. 2 shows a partial cross-sectional view through the body of the fuel to vapor storage and recovery apparatus in its upper region in FIG. 1.

In the assembled position of the outer housing member 8 and the inner housing member 9, as shown in FIG. 2, the first outer compartment 3 and the second inner compartment 4 are connected in series and may be passed by gas in an end to end fashion from the tank port 5 to the atmospheric vent port 7.

The inner housing member 9 for this purpose is sealingly fitted into the outer housing member 8, as may be taken from FIG. 2. The outer housing member 8 includes a downwardly extending neck portion 10 defining an inner wall of the outer housing member 8. The neck portion 10 of the outer housing member 8 is in engagement with a correspondingly shaped neck portion 11 of the inner housing member. Both, the neck portion 10 as well as the neck portion 11 have a circular cross-section and tightly fit into each other, as this can be seen in FIG. 2.

As this can be taken from FIG. 1, the neck portion 11 of the inner housing member 9 has a dove tail profile 16, which comes into interlocking engagement with a corresponding profile of the neck portion 10 of the outer housing member 8, so the inner housing member 9 and the outer housing member 8 are fixed to each other in terms of a rotational movement.

The neck portion 10 of the outer housing member 8 is defined by an inner wall 12 of the outer housing member 8, the neck portion 11 of the inner housing member 9 is defined by a wall 13. Inner wall 12 and wall 13 both are arranged such that in the mounted position of the inner housing member 9, the front faces of the inner wall 12 and the wall 13 are aligned. A closure cap 14, which defines the atmospheric vent port 7 is dimensioned such that a sealing surface 15 of closure cap 14 covers the front faces of inner wall 12 and wall 13, which abut the sealing surface 15. Rotation of the closure cap, i.e. spinning the closure cap 14, and at is the same time applying pressure in axial direction (see arrow in FIG. 2) produces a rotational weld sealing the closure cap 14 against the inner wall 12 and the wall 13 of the inner housing member 9.

It will be appreciated by a person skilled in the art that instead of rotational welding also vibration welding or vibration welding by rotating the part to be welded only over a segment of a circle with high frequency may be applied.

Thus, the closure cap 14 at the time achieves sealing of the inner housing member 9 and the outer housing member 8 without the need for additional sealing means.

After fitting the inner housing member 9 into the outer housing member 8, an adsorbent material will be filled at least into the first outer compartment 3 and the housing will be closed by a bottom lid.

REFERENCE NUMERALS

1 carbon canister
2 housing
3 first outer compartment
4 second inner compartment
5 tank port
6 purge port
7 atmospheric vent port
8 outer housing member
9 inner housing member
10 neck portion
11 neck portion
12 inner wall
13 wall of inner housing member
14 closure cap
15 sealing surface
16 dove tail profile

What is claimed is:

1. A fuel vapour storage and recovery apparatus comprising:
    a housing defining at least a first compartment and a second compartment, at least one compartment of the first and second compartments being filled with an adsorbent material,
    at least one vapor inlet port connectable to a fuel tank vent line,
    at least one atmospheric vent port,
    an outer housing member defining the first compartment as a first outer compartment,
    an inner housing member defining the second compartment as a second inner compartment, the first outer compartment encompassing the second inner compartment,
    wherein the inner housing member is fitted into the outer housing member at one end of the housing such that a wall of the inner housing member engages an inner wall of the outer housing member, and
    wherein the inner housing member and the outer housing member are sealed against each other by a closure cap covering at least a front face of the inner wall of the outer housing member and at least the front face of the wall of the inner housing member,
    wherein the inner housing member and the outer housing member are fitted into each other such that the front face of the inner wall of the outer housing member and the front face of the wall of the inner housing member are aligned and sealing is provided by the closure cap covering the aligned front faces of the inner wall of the outer housing member and the wall of the inner housing member.

2. The fuel vapor storage and recovery apparatus according to claim 1, wherein the closure cap is welded onto the inner wall of the outer housing member and the wall of the inner housing member.

3. The fuel vapor storage and recovery apparatus according to claim 1, wherein the inner wall of the outer housing member and the wall of the inner housing member engage each other by positively interlocking.

4. The fuel vapor storage and recovery apparatus according to claim 1, wherein the inner wall of the outer housing member defines a neck portion extending into the outer housing member and mating with a correspondingly shaped neck portion of the inner housing member.

5. The fuel vapor storage and recovery apparatus according to claim 1, wherein the closure cap includes the atmospheric vent port.

6. The fuel vapor storage and recovery apparatus according to claim 4, wherein the neck portion of the outer housing member and the neck portion of the inner housing member each have a circular cross-section.

7. The fuel vapor storage and recovery apparatus according to claim 1, wherein the housing consists of thermoplastic resin.

8. A method for producing a fuel vapor storage and recovery apparatus comprising first and second compartments at least one compartment receiving an adsorbent material, the method including the following steps:
    providing at least one outer housing member defining a first outer compartment providing an inner housing member defining a second inner compartment, the inner and the outer housing member being configured such that the inner housing member may be engaged with an inner wall of the outer housing member, the outer housing member thereby encompassing the inner housing member axially fitting the inner housing member into the outer housing member sealing the inner housing member and the outer housing member relative to each other in the area of their mutual engagement by welding a closure cap on both, the inner housing member and the outer housing member, such that the weld seals the inner housing and the outer housing against each other.

9. The method according to claim 8, wherein the closure cap is rotation-welded onto the housing.

10. The method according to claim 8, wherein the closure cap is rotated relative to the inner and outer housing while being held in place with a sealing surface in engagement with aligned wall faces of the inner housing member wall and an inner wall of the outer housing member.

* * * * *